United States Patent

Nomura et al.

[15] 3,650,191
[45] Mar. 21, 1972

[54] CAMERA FOR MAKING MULTIPLE EXPOSURES

[72] Inventors: Katsuhiko Nomura, Kawagoe; Koichiro Watanabe; Fumio Urano, both of Tokyo-to, all of Japan

[73] Assignee: Asahi Kogaku Kogyo Kabushiki Kaisha, Tokyo-to, Japan

[22] Filed: Jan. 20, 1971

[21] Appl. No.: 107,885

[30] Foreign Application Priority Data

Jan. 26, 1970 Japan....................................45/6266

[52] U.S. Cl. ..............................95/31 R, 95/31 AC, 242/71
[51] Int. Cl. ....................................G03b 15/00, G03b 17/42
[58] Field of Search.............95/31 R, 31 AC; 242/71.4, 71.5, 242/71.6

[56] References Cited

FOREIGN PATENTS OR APPLICATIONS 1,951,940  5/1970  Germany..............................242/71.6

Primary Examiner—Joseph F. Peters, Jr.
Assistant Examiner—Russell E. Adams, Jr.
Attorney—Steinberg & Blake

[57] ABSTRACT

A camera capable of making multiple exposures. The camera includes a rotary film spool on which film is wound as well as a film-transporting element for transporting film in the camera. A film advancing mechanism is actuated in order to advance film and cock the shutter, and this latter mechanism frictionally engages the film spool to transmit rotary movement thereto frictionally. The film-transporting structure is capable of being coupled to and uncoupled from the film-advancing mechanism, and a restraining member is provided to be displaced from a non-restraining position to a restraining position engaging the spool to prevent the latter from being frictionally rotated by the film-advancing structure. A manually operable structure is accessible to be actuated by the operator for placing the restraining member in its restraining position preventing rotation of the film spool and for simultaneously uncoupling the film-transport structure from the film-advancing drive, so that with the parts in this condition the film-advancing structure can be actuated only to cock the shutter, while the film remains stationary in the position it had during the previous exposure, thus enabling a multiple exposure to be made.

10 Claims, 6 Drawing Figures

INVENTORS
KATSUHIKO NOMURA
KOICHIRO WATANABE
BY FUMIO URANO

Steinberg and Blake
ATTORNEYS

INVENTORS
KATSUHIKO NOMURA
KOICHIRO WATANABE
BY FUMIO URANO

Steinberg and Blake
ATTORNEYS

CAMERA FOR MAKING MULTIPLE EXPOSURES

BACKGROUND OF THE INVENTION

The present invention relates to cameras.

In particular, the present invention relates to a camera structure which can be operated in order to make an intentional multiple exposure.

As is well known, it is sometimes desirable to make multiple exposures in order to achieve special effects. Most modern cameras are designed to advance the film and simultaneously cock the shutter in a manner which will prevent a multiple exposure from being made unintentionally. Therefore, special measures must be taken in order to provide an intentional multiple exposure.

According to one known construction provided for this purpose, a film-winding spool is connected by a clutch with the film-advancing structure and a second clutch is provided for engaging and disengaging the film-transporting sprocket. By way of a suitable operating button or the like both of these clutches can be disengaged, to prevent advance of the film while the shutter is cocked so as to make a multiple exposure. In other words, with both of these clutches disengaged it is possible to actuate the film-advancing structure without actually advancing the film so that instead only the shutter is cocked, thus enabling a second exposure to be made on the frame which was previously exposed.

In actual practice, however, this construction has not proved to be satisfactory. The usual procedure required in connection with such conventional structure involves raising a rewinding crank provided on the upper part of the cover prior to operating the button which disengages the clutches, after a first exposure has been made, manually depressing this rewinding crank after the winding of film in connection with a film cartridge takes place, and then operating the button which actuates the clutches, followed by actuation of the film-advancing structure in order to bring about only cocking of the shutter. With this relatively complex structure it is possible to make a second exposure without any substantial displacement of the film.

It is also possible in a conventional camera to carry out operations very carefully according to which the rewinding crank is manipulated only to rewind a single frame back into the film cartridge, after a first exposure has been made, then releasing the rewinding crank, and then operating the film-advancing structure so as to advance the already exposed frame back into the exposure position while cocking the shutter. With this latter type of procedure it is almost unavoidable that there will be a slight displacement of the film in its second position for the second exposure, with respect to the position which the film had at the time of the first exposure, so that the desired stability of the film for both exposures is not assured, particularly since the spool on which the film is wound is frictionally coupled with a shaft which is turned in order to bring about advance of the film.

It is apparent from the above considerations of conventional structures that the most important and essential requirement for effective multiple-exposures is to be able to cock the shutter in order to make a second exposure while movement of the film is prevented. In the former case where a pair of clutches are provided, including the special clutch between the spool and the shaft which is connected to the latter through the special clutch, there is an undesirable influence on the rotation of the spool due to the presence of the clutch and in addition the assembly is extremely complex, requiring complex assembly procedures and undesirably increasing the cost of the structure. In the second case, where the film is rewound through a film frame so as to be advanced a second time in order to make a second exposure on the same frame, an exceedingly skillful operation of the camera is required since there may be an accidental undesired displacement of the film so that at the time of the second exposure the previously exposed film frame does not precisely assume the position it had at the time of the first exposure.

SUMMARY OF THE INVENTION

It is accordingly a primary object of the present invention to provide a construction which will avoid the above drawbacks.

In particular it is an object of the present invention to provide for multiple exposures a spool which is frictionally driven but which can be prevented from rotating without requiring the use of an additional special clutch for this purpose.

Thus, it is an object of the present invention to provide a simple inexpensive structure which can be operated in a fully reliable manner to maintain the film absolutely stationary while the shutter is cocked a second time in order to make a second exposure on a film frame which has already been exposed, without any movement of the film frame after the first exposure has been completed so that the film remains precisely in the desired position at the time of the second exposure.

Also, it is an object of the present invention to provide a construction which will reliably prevent any multiple exposures from being made except when desired by the operator.

Furthermore, it is an object of the present invention to provide a construction according to which the film rewinding structure, present in any case for the rewinding of the exposed film, can be readily manipulated in order to carry out a multiple exposure when desired.

Also, it is an object of the present invention to provide a structure according to which release of the multiple exposure structure, without any further operations, will automatically set the camera in a position for carrying out its normal single exposure operation on successive frames.

According to the invention the camera has a spool on which film is wound during normal operation of the camera. A film-advancing means is provided for advancing film in the camera and for simultaneously cocking the shutter thereof, and this film-advancing means frictionally engages the spool to rotate the latter frictionally. A film-transporting means is present in the camera for transporting film, and a coupling means is provided for coupling the film-advancing means to the film-transporting means. This coupling means is movable between a coupled position where the drive will be transmitted to the film-transporting means and an uncoupled position where the film-transporting means is disconnected from the film-advancing structure. A restraining means is movable between a non-restraining position displaced from the film spool and a restraining position engaging the film spool to prevent the latter from being frictionally rotated by the film-advancing means. Finally, a manually operable means coacts with the restraining means as well as with the coupling means for placing the restraining means in its restraining position and simultaneously placing the coupling means in its uncoupled position, whenever it is desired to make a multiple exposure. When this manually operable means is actuated, the film-advancing means can be actuated to cock the shutter without advancing film, so that a second exposure can be made on a frame which has already been exposed, without any movement of the frame taking place between the exposures.

BRIEF DESCRIPTION OF DRAWINGS

The invention is illustrated by way of example in the accompanying drawings which form part of this application and in which.

DESCRIPTION OF PREFERRED EMBODIMENTS

Figure 3:
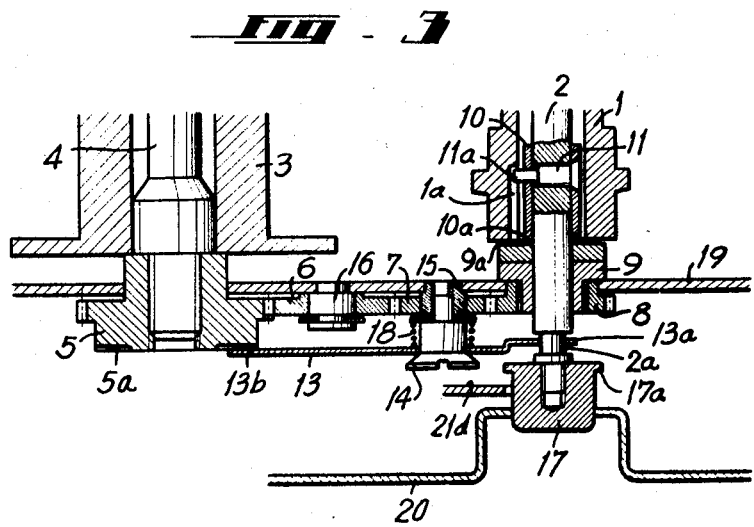
FIG. 3 is a fragmentary longitudinal sectional elevation showing details of the structure of FIGS. 1 and 2, FIG. 3 illustrating the position which the parts take during rewinding of film.

Referring first to FIG. 3 there is fragmentarily illustrated therein a rotary spool 3 on which film is wound during operation of the camera. This spool 3 frictionally engages a shaft 4 which forms part of a film-advancing means. The shaft 4 is turned through an unillustrated lever accessible at the exterior of the camera in order to advance the film and also in order to cock the shutter simultaneously in a well known manner. The shaft 4 is fixedly connected with a gear 5 which meshes with a gear 6. The gear 6 in turn meshes with a gear 7 which meshes with a gear 8 fixed to a rotary coupling or clutch member 9 having a recess 9a adapted to receive a projection 10a of a sleeve or a ring 10 which is fixed to a vertically movable shaft 2 by way of a screw 11. This screw 11 has a projection 11a received in an axial groove 1a of a film-transporting means in the form of a sprocket member 1. The projection 10a and recess 9a form a coupling means for coupling the film-transporting means 1 to the film-advancing means 4–8, when this coupling means is in its coupled position where the projection 10a is received in a recess 9a. At this time actuation of the film-advancing means will frictionally rotate the spool 3 and will also drive the film-transporting means 1 through the coupling means 9a, 10a.

However, the bottom end of the shaft 2 is fixed with a rewind button 17 capable of being depressed in order to raise the shaft 2 and thus raise the projection 10a out of the recess 9a, thus placing the coupling means in its uncoupled position and disconnecting the drive from the film-advancing means to the film-transporting means 1. FIG. 3 shows a bottom supporting wall 19 carrying elements such as the pin 16 on which the gear 6 is supported for rotation, the pin 15 on which the gear 7 is supported for rotation, and also supporting elements 8 and 9 in the manner illustrated. Also FIG. 3 shows the bottom cover 20 formed with a recess in which the rewind button 17 is accessible.

Thus, whenever it is desired to rewind the exposed film, the button 17 is depressed and the rewinding operations will take place in a known way. In order to maintain the button 17 in its depressed position after it has been depressed by the operator, the shaft 2 is provided with a groove 2a for receiving a portion 13a of a lever 13 which forms a releasable holding means for releasably holding the coupling means 9a, 10a in its uncoupled position. This lever 13 of the releasable holding means is supported for turning movement on a pin 14 which is carried by the member 15 in the manner shown in FIG. 3. A spring 18, which is diagrammatically represented in FIG. 1, acts on the lever 13 so as to urge the end 13a thereof into the groove 2a. The opposed end 13b of the lever 13 is situated in the region of the gear 5. This gear 5 has a bottom driving face portion 5a capable of engaging a surface of the lever 13 at the end 13b thereof. Normally the parts will have the position shown in FIG. 2 where the end 13a of the lever 13 is out of the groove 2a, and the end 13b of the lever 13 does not overlap the gear 5. However, when the button 17 is depressed the spring 18 swings the lever 13 about the pin 14 so as to cause the end 13a to enter into the groove 2a, while the end 13b will overlap and engage the bottom surface of the gear 5. Upon release of the button 17 the lever 13 will prevent the shaft 2 from being urged by an unillustrated spring back to its position where the projection 10a is received in the recess 9a, so that the coupling means remains disengaged. The swinging of the end 13a of the releasable holding means 13 into the groove 2a causes the end 13b to engage the surface 5a. When normal operation of the camera is resumed, the film-advancing means is actuated and the gear 5 is turned, and the surface 5a will now engage the lever 13 and swing the latter in opposition to the spring 18 so that the end 13a of the lever 13 will move out of the recess 2a, thus enabling the unillustrated spring to return the shaft 2 and the button 17 to their original positions where the projection 10a will again be received the recess 9a. Thus, through the drive transmitted to the lever 13 from the driving surface 5a of the gear 5 when normal operation of the camera is again resumed, the releasable holding means 13 is automatically retracted from the shaft 2 so that the coupling means will again become engaged in order to resume the normal operation of the camera.

In accordance with the present invention, in order to make an intentional multiple exposure, a restraining means 24 is provided. This restraining means includes the bell crank lever 24 schematically shown in FIG. 1. This lever is supported for turning movement on a pivot pin 24c which may be carried by any suitable support such as a lug struck from the supporting wall 19. A spring 25, schematically represented in FIG. 1, coacts with the restraining means 24 so as to hold the latter in its normal non-restraining position shown in FIG. 1 where the arm 24a of the lever 24 is spaced from the flange 3a of the spool 3. This spring 25 maintains the other arm 24b of the restraining means 24 in engagement with a surface portion 21c of a button 21 which together with the button 17 forms the manually operable means of this embodiment for bringing about an intentional multiple exposure. This manually operable means 17, 21 includes a motion-transmitting means for transmitting motion from the button 21 to the button 17 while preventing transmission of motion from the button 17 back to the button 21. This motion-transmitting means includes an extension 21d integral with and projecting laterally from the button 21 up to the region of the button 17 with this extension 21 located closely adjacent to the button 17. The button 17 has a lip 17a projecting from the button 17 and situated only on the upper side of the extension 21d as is apparent from FIGS. 1 and 3. Thus, with this motion-transmitting means when the button 21 is depressed the extension 21d will engage the lip 17a so as to depress simultaneously the button 17 and bring about uncoupling of the coupling means 9a, 10a. Simultaneously the depression of the button 21 will swing the restraining means 24 about the pin 24c in opposition to the spring 25 so as to place the arm 24a against the flange 3a, thus holding the spool 3 against the rotation by frictional engagement with the shaft 4 of the film-advancing means.

Figure 1:
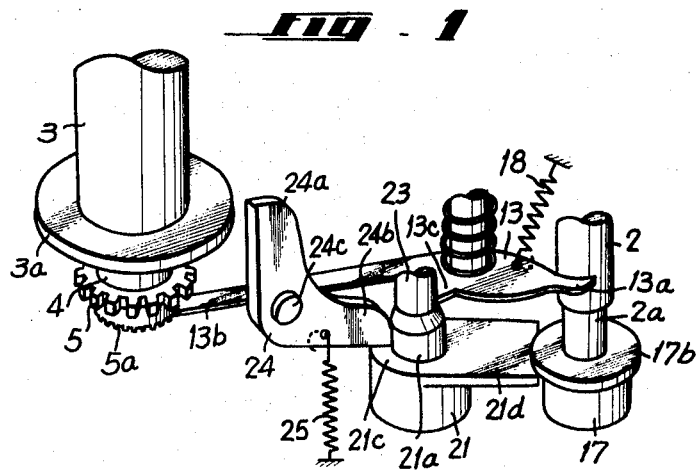
FIG. 1 is a schematic perspective illustration of one embodiment of a structure according to the invention.
Figure 5:
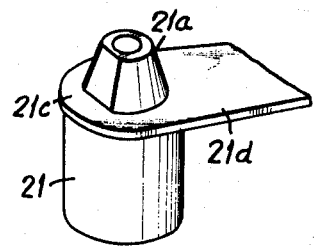
FIG. 5 is a perspective illustration of an operating button which is actuated in order to carry out a multiple exposure.

Part of the button 21 of the manually operable means is in the form of a camming portion 21a, which is tapered as shown most clearly in FIGS. 1 and 5 and which engages an arm 13c of the lever 13, when the button 21 is depressed, so as to prevent the lever 13 from being turned by the spring 18, and thus when the button 21 is depressed the releasable holding means formed by the lever 13 will be maintained in its release position. Thus, upon release of the button 21 the shaft 2 can be urged by the unillustrated spring back to its initial position with the projection 10a entering the recess 9a, and the lever 13 will not operate to retain the clutch or coupling means 9a, 10a in its uncoupled position.

The button 21 extends from a shaft 23 guided through any suitable bearing structure for vertical movement and acted upon by an unillustrated spring which acts on the button 21 so as to maintain the latter normally in a rest position where the restraining means 24 is in its non-restraining position and the coupling means 9a, 10a is engaged.

Figure 2:
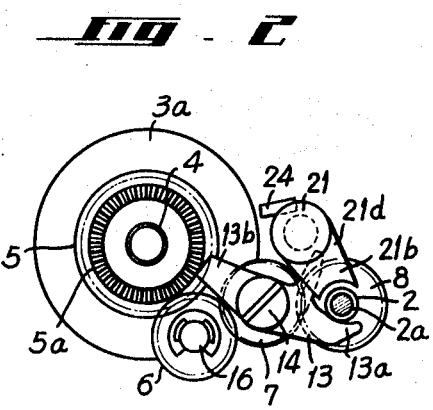
FIG. 2 is a bottom plan view of the structure of the invention, corresponding to the embodiment schematically represented in FIG. 1.
Figure 4:
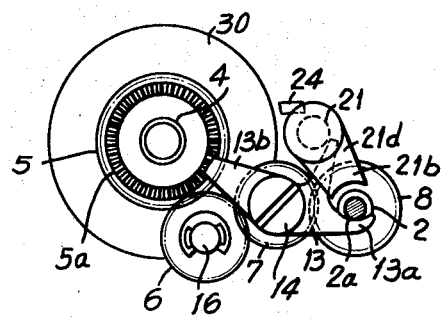
FIG. 4 is a bottom plan view corresponding to FIG. 2 but showing the parts in the position they take during rewinding of film.

The parts are shown in their rest position in FIGS. 1 and 2, while FIGS. 3 and 4 show the position assumed by the parts during rewinding operations, and FIG. 5 shows the multiple-exposure button 21 with the extension 21d and tapered camming portion 21a thereof, the surface 21c which engages the restraining means 24 also being shown in FIG. 5. As is apparent from FIG. 5 it is possible to provide at the top end of camming portion 21a a recess to receive a spring situated at the bottom end of a shaft such as a shaft 23 which remains stationary and which enters into the bore of the button 21 to guide the latter while the spring within the bore of the button 21 engages the bottom end of shaft 23 and the button 21 to urge the latter downwardly to its rest position. The curved free end portion of the extension 21d will coact with the exterior cylindrical surface of the button 17 to prevent turning of the button 21 on the guide shaft 23 with such a construction.

Thus, with the structure described above, when rewinding of film is desired, the operator need only to press the button 17, and the button 21 will remain stationary. When a multiple exposure is desired, however, the operator can press the button 21, and the button 17 will necessarily be depressed therewith, bringing about disengagement of the coupling means 9a, 10a and simultaneous pressure of the restraining means 24 against the flange 3a with a force greater than the force of friction between the shaft 4 and the spool 3, so that the latter will remain stationary when the shaft 4 is turned upon actuation of the film-advancing means. Thus, when the parts are operated in this way the film-advancing means will be actuated only to cock the shutter, while the film will remain stationary, and thus a second exposure can be made without any movement of the film subsequent to the first exposure thereof. At the same time it is a simple matter to manipulate the button 17 in a conventional manner in connection with rewinding of the film whenever desired.

It is to be noted that the spring 25 functions not only to hold the restraining means 24 normally in its non-restraining position but also this spring can be used to releasably hold the button 21 in its rest position ready to be depressed by the operator when a multiple exposure is desired. Also, it is to be noted that this operation can take place only while the operator maintains the button 21 depressed, so that manual operation is essential during cocking of the shutter for a second time without movement of the film. Immediately upon release of the button 21 the parts will resume their normal position enabling normal camera operation to take place.

As was pointed out above, upon release of the button 17 after film rewinding operations have been completed, the lever 13 will still hold the coupling means 9a, 10a in its uncoupled position, but the next actuation of the film-advancing means will cause the driving surface 5a of the gear 5 to turn the lever 13 to its release position releasing the shaft 2 so that the coupling means 9a, 10a can again assume its coupled position.

Figure 6:
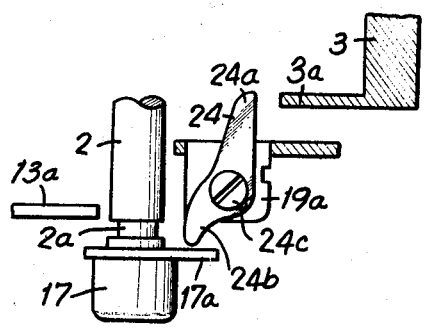
FIG. 6 is a schematic, fragmentary, partly sectional elevation of another embodiment of a structure according to the invention.

A simplification of the above structure may be provided with the embodiment of FIG. 6 according to which a separate button 21 need not be provided in order to carry out a multiple exposure. As may be seen from FIG. 6, the wall 19 has the lug 19a on which the restraining means 24 is supported for swinging movement by way of the pin 24c. This restraining means 24 is also in the form of a lever having the arm 24a adapted to engage the flange 3a so as to prevent the spool 3 from being frictionally rotated by the film-advancing means. However, with this embodiment the single rewind button 17 has an extended lip 17a engaged by the arm 24b of the restraining lever 24. Thus when the rewind button 17 is depressed the lever 24 is directly actuated by the button 17 so as to assume its restraining position pressing against the flange 3a so as to prevent rotation of the spool 3. A spring 25 which is not illustrated in FIG. 6 urges the lever 24 in a counterclockwise direction, as viewed in FIG. 6, so as to maintain the arm 24b in engagement with the extension 17a of the button 17.

Of course, with this embodiment also when the shaft 2 is displaced upwardly the coupling means 9a, 10a is placed in its uncoupled position.

With this embodiment when the rewind button 17 is fully depressed the multiple exposure will be made, since in the fully depressed position of the button 17 the restraining means 24 will engage the spool 3 so as to prevent frictional rotation thereof by the film-advancing means. Thus, in this fully depressed position of the button 17, the coupling means is in its uncoupled position and the restraining means is in its restraining position so that the film-advancing means can be actuated in order to cock the shutter without advancing the film which remains stationary at this time. When the shutter is then tripped the multiple exposure will be made.

However, when rewinding of the film is desired, the button 17 after being fully depressed can be released so as to assume a partially depressed position. Upon release of the button 17 from its fully depressed position, the releasable holding means formed by the lever 13 will enter at its end 13a into the groove 2a so as to prevent full return of the button 17 to its initial position. In its partially depressed position determined by engagement of the lever 13 in the groove 2a, the coupling means 9a, 10a is still in its uncoupled position, while at the same time the lever 24 is spaced from the flange 3a, so that now rewinding operations can take place in the normal way without any restraint of the spool 3 from executing a rotary movement. Thus, in the partially depressed position determined by engagement of the end 13a of lever 13 in the groove 2a, the spring 25 places the lever 24 beyond the flange 3a while at the same time the drive from the film-advancing means to the sprocket 1 will be interrupted. Thereafter, when normal operations are resumed, the driving surface 5a of the gear 5 will act on the lever 13 to displace it out of the groove 2a, in exactly the manner described above.

It is thus apparent that with the structure of the invention the shutter can readily be cocked without displacement of the film. A special clutch between the spool 3 and the shaft 4 is completely unnecessary. Such a special clutch may unavoidably result in some film movement when the film-advancing means is actuated to cock the shutter. This risk of even a slight film movement is completely eliminated with the structure of the invention according to which the spool 3 is positively held stationary by the restraining means 24. Thus when the film-advancing means is actuated, with the structure of the invention, solely for the purpose of cocking the shutter, only the shaft 4 will turn while the spool 3 will positively remain stationary to reliably prevent any film displacement from taking place.

In addition it is to be noted that the structure of the invention is extremely convenient to manipulate and is of an exceedingly simple construction in view of the fact that the positive prevention of spool rotation is achieved through an exceedingly simple mechanism and at the same time an effective actuation of the coupling means 9a, 10a is achieved through the extension 21d. With the embodiment of FIG. 6, an exceedingly simple construction is provided with the same advantages of positively restraining the spool 3 against rotation when the film-advancing means is actuated solely to cock the shutter. Thus, with this construction the careful depression of the film-winding crank in order to actuate a rewinding of only one film frame in order to again advance an exposed frame into the exposure position is completely unnecessary and the disadvantages encountered with conventional cameras are avoided.

What is claimed is:

1. In a camera, a rotary film spool on which film is wound, film-advancing means for advancing film and for simultaneously cocking a shutter of the camera in preparation for making an exposure, said film-advancing means frictionally engaging said spool for frictionally transmitting rotation thereto, and film-transporting means for transporting film in the camera; an assembly for making multiple exposures comprising releasable coupling means for releasably coupling said film-advancing means with said film-transporting means, said releasable coupling means having a coupled position transmitting a drive from said film-advancing means to said film-transporting means and an uncoupled position disconnecting said film-transporting means from said film-advancing means, restraining means having a restraining position engaging said spool to restrain the latter against rotation by frictional engagement with said film-advancing means and a non-restraining position displaced from said spool to free the latter for frictional rotation by said film-advancing means, and manually operable means coacting with said restraining means and said coupling means for placing said restraining means in said restraining position thereof and for simultaneously placing said coupling means in said uncoupled position thereof so that upon actuation of said manually operable means said film-advancing means can be actuated to cock the shutter without advancing film so as to prepare the camera for making a multiple exposure.

2. The combination of claim 1 and wherein said restraining means is in the form of a swingable lever swingable to and from said restraining position thereof and normally assuming said non-restraining position, said manually operable means engaging said lever for swinging the latter from said non-restraining position to said restraining position thereof.

3. The combination of claim 1 and wherein said manually operable means consists of a single operating button engaging said restraining means and operatively connected with said coupling means for placing said restraining means in said restraining position thereof and for placing said coupling means in said uncoupled position thereof when said button is depressed.

4. The combination of claim 3 and wherein said button has a partially depressed position where said coupling means is in said uncoupled position thereof while said restraining means is out of engagement with said spool, and means for releasably holding said button in said partially depressed position thereof for rewinding film.

5. The combination of claim 1 and wherein said manually operable means includes a multiple-exposure button engaging said restraining means to place the latter in said restraining position thereof when said multiple-exposure button is depressed and a rewind button operatively connected with said coupling means for placing the latter in said uncoupled position thereof when said rewind button is depressed, and motion-transmitting means extending between said buttons for transmitting movement of said multiple-exposure button to said rewind button while freeing said rewind button for depression independently of said multiple-exposure button, so that said rewind button of said manually operable means can be independently depressed for rewinding film while said multiple-exposure button is depressed for placing said restraining means in said restraining position and for simultaneously actuating said rewind button to place said coupling means in said uncoupled position thereof.

6. The combination of claim 5 and wherein a releasable holding means coacts with said rewind button for releasably holding the latter in its depressed position maintaining said coupling means in said uncoupled position thereof upon release of said rewind button after the latter has been depressed when actuated independently of said multiple-exposure button.

7. The combination of claim 6 and wherein said multiple-exposure button has a portion coacting with said releasable holding means for preventing the latter from holding said rewind button in its depressed position when said multiple-exposure button is depressed.

8. The combination of claim 7 and wherein said releasable holding means is in the form of a swingable lever, said coupling means including a shaft portion formed with a groove for receiving a part of said lever which when in said groove retains said coupling means in said uncoupled position thereof, and said multiple-exposure button having a camming portion engaging said lever to prevent the latter from entering said groove.

9. The combination of claim 8 and wherein said motion-transmitting means includes an extension fixed to and extending from said multiple-exposure button and located beside said rewind button, the latter having a lip situated on one side of said extension to be engaged thereby when said multiple-exposure button is depressed while freeing said rewind button for actuation independently of said multiple-exposure button.

10. The combination of claim 5 and wherein said motion-transmitting means includes an extension fixed to and extending from said multiple-exposure button up to the region of said rewind button, the latter having a lip situated on one side of said extension to be engaged thereby when said multiple-exposure button is actuated while freeing said rewind button for depression independently of said multiple-exposure button.

* * * * *